US012350802B2

(12) United States Patent
Lübkert et al.

(10) Patent No.: US 12,350,802 B2
(45) Date of Patent: Jul. 8, 2025

(54) ELECTROPNEUMATIC IMPACT MECHANISM

(71) Applicant: Hilti Aktiengesellschaft, Schaan (LI)

(72) Inventors: Ernst-Rudolf Lübkert, Landsberg am Lech (DE); Uto Plank, Freising (DE); Jochen Erhardt, Klosterlechfeld (DE)

(73) Assignee: Hilti Aktiengesellschaft, Schaan (LI)

(*) Notice: Subject to any disclaimer, the term of this patent is extended or adjusted under 35 U.S.C. 154(b) by 267 days.

(21) Appl. No.: 17/916,928

(22) PCT Filed: Apr. 7, 2021

(86) PCT No.: PCT/EP2021/059072
§ 371 (c)(1),
(2) Date: Oct. 4, 2022

(87) PCT Pub. No.: WO2021/213804
PCT Pub. Date: Oct. 28, 2021

(65) Prior Publication Data

US 2023/0150103 A1 May 18, 2023

(30) Foreign Application Priority Data

Apr. 21, 2020 (EP) .................................... 20170526

(51) Int. Cl.

| | |
|---|---|
| ***B25D 11/12*** | (2006.01) |
| ***B25D 17/06*** | (2006.01) |
| ***B25D 17/26*** | (2006.01) |

(52) U.S. Cl.
CPC .............. *B25D 11/12* (2013.01); *B25D 17/26* (2013.01); *B25D 2217/0065* (2013.01);
(Continued)

(58) Field of Classification Search
CPC ............................... B25D 11/12; B25D 17/26; B25D 2217/0065; B25D 2250/121; B25D 2250/345; B25D 2250/365
See application file for complete search history.

(56) References Cited

U.S. PATENT DOCUMENTS 3,114,423 A * 12/1963 Lennart ................ B25D 17/005 279/19.3
3,161,242 A * 12/1964 Etzkorn .............. B25D 17/005 173/109

(Continued)

FOREIGN PATENT DOCUMENTS

DE 2439039 A1 * 2/1976 ........... B25D 11/125
DE 2605998 A1 8/1977

(Continued)

OTHER PUBLICATIONS

International Search Report of PCT/EP2021/059072 dated Jun. 9, 2021.

*Primary Examiner* — Anna K Kinsaul
*Assistant Examiner* — David G Shutty
(74) *Attorney, Agent, or Firm* — Davidson Kappel LLC

(57) ABSTRACT

An electropneumatic impact mechanism for an electric hand-held power tool, in particular a hammer drill and/or chipping hammer, wherein the impact mechanism has a transmission housing, a guide tube arranged at least partially in the transmission housing, an exciter piston that is movable in the guide tube, a connecting rod coupled to the exciter piston, and an eccentric wheel which is designed as an externally toothed gearwheel and is coupled to the connecting rod on one side and is mounted so as to be rotatable with respect to the transmission housing about an axis of rotation on the other side, an axial gap, preferably for optionally receiving at least part of a lubrication space separating element, is provided between an eccentric wheel surface (Continued)

facing the connecting rod and a connecting rod surface facing the eccentric wheel.

15 Claims, 1 Drawing Sheet

(52) U.S. Cl.
CPC .. *B25D 2250/121* (2013.01); *B25D 2250/345* (2013.01); *B25D 2250/365* (2013.01)

(56) References Cited

U.S. PATENT DOCUMENTS

| | | | | | |
|---|---|---|---|---|---|
| 4,345,768 | A * | 8/1982 | Roussin | B25D 17/06 92/99 |
| 7,048,076 | B2 * | 5/2006 | Cecchin | B25D 11/125 173/216 |
| 7,059,425 | B2 * | 6/2006 | Ikuta | B25D 17/24 173/128 |
| 7,513,317 | B2 * | 4/2009 | Satou | B25D 17/24 173/48 |
| 8,613,328 | B2 * | 12/2013 | Meixner | B25D 11/125 173/205 |
| 10,507,570 | B2 * | 12/2019 | Ueda | B25F 5/02 |
| 10,864,622 | B2 * | 12/2020 | Yoshikane | B25D 16/00 |
| 2002/0050367 | A1 * | 5/2002 | Manschitz | B25D 11/125 173/216 |
| 2009/0032275 | A1 * | 2/2009 | Ikuta | B25D 17/24 173/210 |
| 2009/0266572 | A1 | 10/2009 | Meixner et al. | |

FOREIGN PATENT DOCUMENTS

| | | | | |
|---|---|---|---|---|
| DE | 102013221117 | A1 * | 5/2015 | B23Q 11/122 |
| EP | 1182012 | A2 | 2/2002 | |
| EP | 2873488 | A1 | 5/2015 | |

* cited by examiner

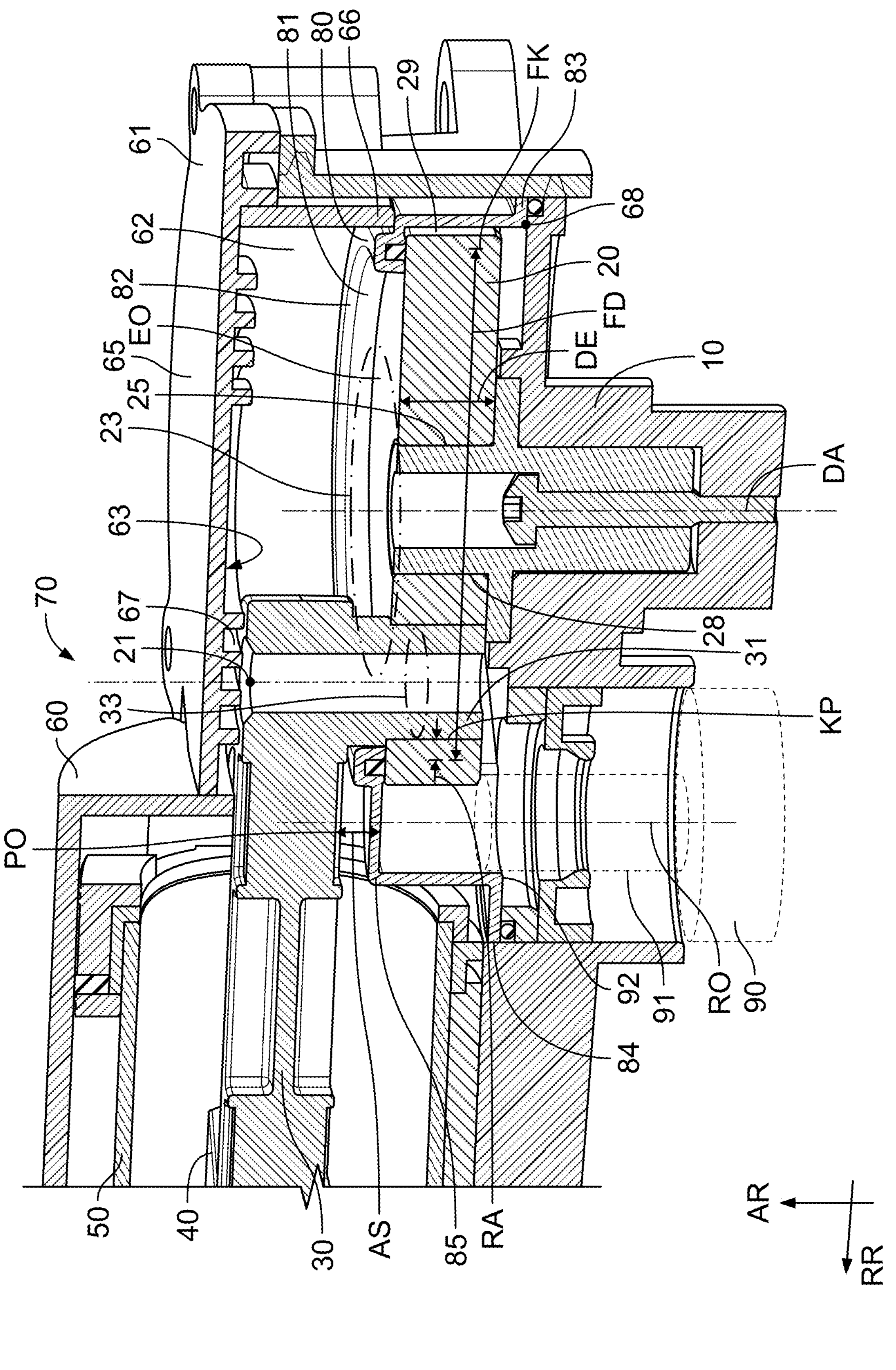
81
80
66
29
FK
83
61
68
62
20
82
FD
EO
65
DE
10
25
23
DA
63
70
67
28
21
31
33
60
KP
PO
92
91
RO
90
84
50
40
30
AS
85
RA
AR
RR

ELECTROPNEUMATIC IMPACT MECHANISM

The present invention relates to an electropneumatic impact mechanism for an electric hand-held power tool, in particular a hammer drill and/or chipping hammer. The impact mechanism is provided with a transmission housing, a guide tube arranged at least partially in the transmission housing, an exciter piston that is movable in the guide tube, a connecting rod coupled to the exciter piston, and an eccentric wheel which is designed as an externally toothed gearwheel. The eccentric wheel is coupled to the connecting rod on one side and is mounted so as to be rotatable with respect to the transmission housing on the other side.

BACKGROUND

Impact mechanisms of the type mentioned at the beginning and hand-held power tools with such impact mechanisms are basically known from the prior art.

SUMMARY OF THE INVENTION

It is an object of the present invention to provide an impact mechanism which enables comparatively flexible use.

The present invention provides an axial gap between an eccentric wheel surface facing the connecting rod and a connecting rod surface facing the eccentric wheel. The axial gap is preferably used to optionally accommodate a lubrication space separating element, or at least a part thereof. It has been found to be advantageous if a radial spacing is provided between a contact point furthest away from the axis of rotation in the radial direction, which is between the connecting rod and the eccentric wheel, and the root circle of the eccentric wheel, which is designed as an externally toothed gearwheel. The radial spacing is preferably used to optionally accommodate a/the lubrication space separating element, or at least a part thereof.

The invention includes the finding that an optional introduction of a lubrication space separating element enables the lubrication space separating element to be dispensed with, for example in markets where lubrication space separation is not required. In markets where lubrication space separation is required, a lubrication space separation element possibly having seals can be introduced. By separating the impact mechanism lubrication space and the motor lubrication space, improved lubrication of the toothed parts, for example between a pinion of an electric motor and an external toothing of an eccentric wheel, is possible. In addition, this provides improved sealing against rock and concrete dust, which in turn reduces wear on the pinion-external toothing pairing or at least extends it over time. It is also conceivable for the hand-held power tools and/or the impact mechanisms to be delivered without a lubrication space separating element when they are first delivered and, depending on the type of use and wear, for the lubrication space separating element to be introduced during servicing. By reducing the number of parts, costs and weight are saved in impact mechanisms and/or hand-held power tools without a lubrication space separating element.

In a particularly preferred embodiment, the axial gap, based on the axis of rotation of the eccentric wheel in the axial direction, is at least 20 percent as large as the thickness of the eccentric wheel in the axial direction. It has been found to be advantageous if the axial gap is at least 5 mm. It has been found to be advantageous for the radial spacing between the contact point and the root circle to be at least 5 percent of a root circle diameter (FD) of the root circle. It has been found to be advantageous if the radial spacing is at least 5 mm.

In a particularly preferred embodiment, preferably for a specific market, the impact mechanism has a lubrication space separating element which is received in the axial gap and/or in the radial spacing. It has been found to be advantageous if the lubrication space separating element has an annular sealing collar with a dynamic sealing ring which is arranged coaxially with respect to the axis of rotation and is pressed against the radial spacing.

In a further preferred embodiment, the lubrication space separating element has an end sealing collar which at least partially seals the eccentric wheel in relation to a housing wall. The end sealing collar can have a static sealing ring which is arranged coaxially with respect to the axis of rotation and is pressed against an inner edge of the transmission. In a further preferred embodiment, the lubricating space separating element has a sleeve-shaped sealing chamber for receiving a pinion of an electric motor. It has been found to be advantageous if the annular sealing collar, the end sealing collar and the sealing chamber are formed integrally with one another.

In a particularly preferred embodiment, the lubrication space separating element is free from axial support loads which are indirectly or directly caused by the connecting rod. Advantageously, a height of the annular sealing collar in the axial direction is smaller than the axial gap. In a particularly preferred embodiment, the cover shell has, on a side facing the eccentric wheel, a retaining lip for securing the connecting rod in the axial direction. A profile of the retaining lip preferably at least partially follows a circular path of an eccentric point of the eccentric wheel. A plurality of retaining lips, each configured concentrically with respect to one another, can be provided. The retaining lips can differ in diameter from one another. The closure cover can have a support collar which extends in the axial direction and which stands up on the end sealing collar in the axial direction.

The present invention also provides an electric hand-held power tool, in particular a hammer drill and/or chipping hammer, with an impact mechanism as described above. It has been found to be advantageous if the hand-held power tool has an electric motor with a pinion for directly driving the eccentric wheel via the external toothing thereof. The pinion and the external toothing of the eccentric wheel can be located in a motor lubrication space. In a further preferred embodiment, the connecting rod and/or a surface portion of the eccentric wheel facing the cover shell are housed in an impact mechanism lubrication space which is hydraulically separated from the motor lubrication space.

The present invention also provides a lubrication space separating element with an annular sealing collar, an end sealing collar and a sealing chamber, which are formed integrally with one another.

Further advantages will become apparent from the following description of the figures. Various exemplary embodiments of the present invention are illustrated in the figures. The figures, the description and the claims contain numerous features in combination. A person skilled in the art will expediently also consider the features individually and combine them to form useful further combinations.

BRIEF DESCRIPTION OF THE DRAWING

In the FIGURES, identical and similar components are denoted by the same reference signs. Specifically:

FIG. 1 shows a preferred exemplary embodiment of an impact mechanism according to the invention.

DETAILED DESCRIPTION

A first preferred exemplary embodiment of an electro-pneumatic impact mechanism 70 of an electric hand-held power tool is illustrated in FIG. 1.

The electropneumatic impact mechanism 70 has a transmission housing 60 and a guide tube 50, wherein the guide tube 50 is arranged at least partially in the transmission housing 60. The electropneumatic hammer mechanism 70 also has an exciter piston 40 that is movable in the guide tube 50, a connecting rod 30 coupled to the exciter piston 40, and an eccentric wheel 20. The eccentric wheel 20 is coupled to the connecting rod 30 on one side and is mounted so as to be rotatable with respect to the transmission housing 60 about an axis of rotation DA via an end plate 10 of the transmission housing 60 on the other side. The end plate 10 is integrated in the transmission housing 60. The eccentric wheel 20 is mounted rotatably on a bearing body 25 by means of a pair of plain bearings 28. The bearing body 25 is introduced into the end plate 10 for rotation therewith. The eccentric wheel 20 is designed as an externally toothed gearwheel 29, which can be rotationally driven by an electric motor 90. For this purpose, the electric motor 90 has a pinion 91 which is paired with the external toothing 29.

As can be seen from FIG. 1, an axial gap AS is provided between an eccentric wheel surface EO facing the connecting rod 30 and a connecting rod surface PO facing the eccentric wheel 20. The axial gap AS, based on the axis of rotation DA of the eccentric wheel 20 in the axial direction AR, is, for example, about 30 percent as large as a thickness DE of the eccentric wheel 20 in the axial direction AR. As can likewise be gathered from FIG. 1, a radial spacing RA is provided between a contact point KP furthest away from the axis of rotation DA in the radial direction RR, which is between the connecting rod 30 and the eccentric wheel 20, and the root circle FK of the external toothing 29 of the eccentric wheel 20. The radial spacing RA between the contact point KP and the root circle FK is, for example, 5 percent of a root circle diameter FD of the root circle FK of the eccentric wheel. The connecting rod 30 has a connecting rod pin 31 which engages in the eccentric wheel 20. The contact point KP is located at the transition from the connecting rod pin 31 to the eccentric wheel 20.

Inside the transmission housing 60, the impact mechanism 70 has an optionally introduced lubrication space separating element 80, which realizes a hydraulic separation between the motor lubrication space 92 and the impact mechanism lubrication space 62. The pinion 91 and the external toothing 29 of the eccentric wheel 20 are located in the motor lubrication space 92. The connecting rod 30 and the wheel surface [26] EQ facing the cover shell 65 (the diameter of which preferably corresponds at most to the root circle diameter FK) are housed in an impact mechanism lubrication space 62 which is hydraulically separated from the motor lubrication space 92.

The lubrication space separating element 80 itself has an annular sealing collar 81, an end sealing collar 83 and a sealing chamber 85. In the exemplary embodiment shown here, the annular sealing collar 81, the end sealing collar 83 and the sealing chamber 85 are formed integrally with one another. The lubrication space separating element 80 is composed, for example, of plastic.

The annular sealing collar 81 is used to seal the eccentric wheel 20 on its side facing the cover shell 65. For this purpose, the annular sealing collar 81, based on the axial direction AR, is accommodated in the axial gap AS between the connecting rod 30 and the eccentric wheel 20. The annular sealing collar 81, based on the radial direction RR, rests, as it were, on the radial spacing RA. The axial gap AS and the radial spacing RA are thus occupied by one and the same separating element in the form of the annular sealing collar 81. The annular sealing collar 81 is provided with a dynamic sealing ring 82 which is arranged coaxially with respect to the axis of rotation DA and is pressed against the radial spacing RA.

The end sealing collar 83 is used to at least partially seal the eccentric wheel 20 in relation to a housing wall 68. For this purpose, the end sealing collar 83 has a static sealing ring 84, which is pressed in the axial direction AR against the housing wall 68. The static sealing ring 84 in the exemplary embodiment of FIG. 1 is arranged coaxially with respect to the axis of rotation DA in the region of the eccentric wheel 20. In the region of the pinion 91, the static sealing ring 84 also lies pressed against the housing wall 68 in the axial direction AR. In this region, however, the sealing ring 84 extends coaxially with respect to the rotation axis RO of the pinion 91.

The sleeve-shaped sealing chamber 85 of the lubrication space separating element 80 finally serves to accommodate the pinion 91 of the electric motor 90.

As can be gathered from FIG. 1, the transmission housing 60 is closed on an upper side 61—from here the connecting rod 30 and the eccentric wheel 20, inter alia, are introduced into the transmission housing 60—by a cover shell 65, which is composed, for example, of plastic. The cover shell 65 has a retaining lip 67 on a side 63 facing the eccentric wheel 20, wherein a profile of the retaining lip 67 follows a circular path 23 of an eccentric point 21 of the eccentric wheel 20. In the exemplary embodiment in FIG. 1, four retaining lips 67 which are concentric with respect to one another and each have a different diameter are provided. The retaining lips 67 are used to secure the connecting rod 80 in the axial direction AR.

The connecting rod 30 also secures the eccentric wheel 20 in the axial direction AR by an annular contact 33 of the connecting rod pin 31 in the eccentric wheel 20—the contact point KP is furthermore located on said annular contact 33. The cover shell 65 is thus directly responsible for securing the connecting rod 30 and indirectly (via the connecting rod 30) for securing the eccentric wheel 20 in the axial direction AR. This power flow described here manages without the "aid" of the lubrication space separating element 90. In other words, the connecting rod 30 and the eccentric wheel 20 are axially secured even without the lubrication space separating element 90, such that, if required—for example if there is no regulatory requirement—the lubrication space separating element 90 can be dispensed with.

In the exemplary embodiment of FIG. 1, a lubrication space separating element 90 is provided. As can also be gathered from FIG. 1, the cover shell 65 has a support collar 66 which extends in the axial direction AR and which stands up in the axial direction AR on the end sealing collar 83 and thus also exerts a pressing effect on the static sealing ring 84 in the axial direction AR. The lubrication space separating element 90 itself is thus held in the transmission housing 60. In addition to the power flow described above without a lubrication space separating element 90 being introduced, when a lubrication space separating element 90 is introduced, additional securing of the eccentric wheel 20 in the axial direction is provided, namely indirectly via the dynamic sealing ring 82 of the annular sealing collar 81, which is formed integrally with the end sealing collar 83. Advantageously, the height of the annular sealing collar 81 is slightly smaller than the axial gap AS, and the annular sealing collar 81 and thus the entire lubrication space separating element 90 are free from axial support loads which are caused indirectly or directly by the connecting rod 30. The lubrication space separating element 90 can thus optionally be encompassed by the impact mechanism 70.

LIST OF REFERENCE SIGNS

10 End plate
20 Eccentric wheel
21 Eccentric point
23 Circular path
25 Bearing body
26 Wheel surface
28 Pair of plain bearings
29 External toothing
30 Connecting rod
31 Connecting rod pin
33 Contact
40 Exciter piston
50 Guide tube
60 Transmission housing
61 Upper side
62 Impact mechanism lubrication space
63 Facing side
65 Cover shell
66 Supporting collar
67 Retaining lip
68 Housing wall
70 Impact mechanism
80 Lubrication space separating element
81 Annular sealing collar
82 Dynamic sealing ring
83 End sealing collar
84 Static sealing ring
85 Sealing chamber
90 Electric motor
91 Pinion
92 Motor lubrication space
AR Axial direction
AS Axial gap
DA Axis of rotation of the eccentric wheel
DE Thickness of the eccentric wheel
EO Eccentric wheel surface
FK Root circle
KP Contact point
FD Root circle diameter
PO Connecting rod surface
RA Radial spacing
RO Rotation axis of the pinion
RR Radial direction

What is claimed is:

1. An electropneumatic impact mechanism for an electric hand-held power tool, the impact mechanism comprising:
- a transmission housing;
- a guide tube arranged at least partially in the transmission housing;
- an exciter piston movable in the guide tube;
- a connecting rod coupled to the exciter piston; and
- an eccentric wheel designed as an externally toothed gearwheel and coupled to the connecting rod on one side and being mounted so as to be rotatable with respect to the transmission housing about an axis of rotation on the other side, the axis of rotation defining an axial direction;
- an axial gap being provided between an eccentric wheel surface facing the connecting rod and a connecting rod surface facing the eccentric wheel;
- a radial spacing being provided between a contact point furthest away from the axis of rotation in a radial direction between the connecting rod and the eccentric wheel and a point in the circumference of a root circle of the eccentric wheel closest to the contact point; and
- a lubrication space separating element received in the axial gap and in the radial spacing, the lubrication space separating element having a sleeve-shaped sealing chamber for receiving a pinion of an electric motor.

2. The impact mechanism as recited in claim 1 wherein the axial gap is at least 20 percent as large as a thickness of the eccentric wheel in the axial direction.

3. The impact mechanism as recited in claim 1 wherein the radial spacing is at least 5 percent of a root circle diameter of the root circle.

4. The impact mechanism as recited in claim 1 wherein the lubrication space separating element has an annular sealing collar with a dynamic sealing ring arranged coaxially with respect to the axis of rotation and pressed against the radial spacing.

5. The impact mechanism as recited in claim 1 wherein the lubrication space separating element has an end sealing collar at least partially sealing the eccentric wheel in relation to a housing wall and has a static sealing ring.

6. The impact mechanism a recited in claim 5 wherein the static sealing ring at least partially arranged coaxially with respect to the axis of rotation and is pressed against the housing wall.

7. The impact mechanism as recited in claim 1 wherein an annular sealing collar, an end sealing collar and the sealing chamber are formed integrally with one another.

8. The impact mechanism as recited in claim 1 wherein the lubrication space separating element is free from axial support loads which are indirectly or directly caused by the connecting rod.

9. The impact mechanism as recited in claim 1 further comprising a cover shell having, on a side facing the eccentric wheel, a retaining lip for securing the connecting rod in the axial direction, wherein a profile of the retaining lip at least partially follows a circular path of an eccentric point of the eccentric wheel.

10. An electric hand-held power tool comprising the impact mechanism as recited in claim 9.

11. The electric hand-held power tool as recited in claim 10 wherein the power tool is a hammer drill or a chipping hammer.

12. The hand-held power tool as recited in claim 10 further comprising an electric motor with a pinion for directly driving the eccentric wheel via the external toothing thereof, wherein the pinion and the external toothing of the eccentric wheel are located in a motor lubrication space, and wherein the connecting rod and a wheel surface of the eccentric wheel facing a cover shell are housed in an impact mechanism lubrication space hydraulically separated from the motor lubrication space.

13. An electric hand-held power tool comprising:
- an electropneumatic impact mechanism for an electric hand-held power tool, the impact mechanism including: a transmission housing; a guide tube arranged at least partially in the transmission housing; an exciter piston movable in the guide tube; a connecting rod coupled to the exciter piston; and an eccentric wheel designed as an externally toothed gearwheel and coupled to the connecting rod on one side and being mounted so as to be rotatable with respect to the transmission housing about an axis of rotation on the other side, the axis of rotation defining an axial direction, an axial gap being provided between an eccentric wheel surface facing the connecting rod and a connecting rod surface facing the eccentric wheel; and an electric motor with a pinion for directly driving the eccentric wheel via the external toothing thereof, wherein the pinion and the external toothing of the eccentric wheel are located in a motor lubrication space, and wherein the connecting rod and a wheel surface of the eccentric wheel facing a cover shell are housed in an impact mechanism lubrication space hydraulically separated from the motor lubrication space.

14. An electropneumatic impact mechanism for an electric hand-held power tool, the impact mechanism comprising:

a transmission housing;

a guide tube arranged at least partially in the transmission housing;

an exciter piston movable in the guide tube;

a connecting rod coupled to the exciter piston; and an eccentric wheel designed as an externally toothed gearwheel and coupled to the connecting rod on one side and being mounted so as to be rotatable with respect to the transmission housing about an axis of rotation on the other side, the axis of rotation defining an axial direction;

an axial gap being provided between an eccentric wheel surface facing the connecting rod and a connecting rod surface facing the eccentric wheel;

a radial spacing being provided between a contact point furthest away from the axis of rotation in a radial direction between the connecting rod and the eccentric wheel and a point in the circumference of a root circle of the eccentric wheel closest to the contact point; and a lubrication space separating element received in the axial gap and in the radial spacing, the lubrication space separating element having an annular sealing collar with a dynamic sealing ring arranged coaxially with respect to the axis of rotation and pressed against the radial spacing.

15. An electropneumatic impact mechanism for an electric hand-held power tool, the impact mechanism comprising:

a transmission housing;

a guide tube arranged at least partially in the transmission housing;

an exciter piston movable in the guide tube;

a connecting rod coupled to the exciter piston; and an eccentric wheel designed as an externally toothed gearwheel and coupled to the connecting rod on one side and being mounted so as to be rotatable with respect to the transmission housing about an axis of rotation on the other side, the axis of rotation defining an axial direction;

an axial gap being provided between an eccentric wheel surface facing the connecting rod and a connecting rod surface facing the eccentric wheel;

a radial spacing being provided between a contact point furthest away from the axis of rotation in a radial direction between the connecting rod and the eccentric wheel and a point in the circumference of a root circle of the eccentric wheel closest to the contact point; and a lubrication space separating element received in the axial gap and in the radial spacing, the lubrication space separating element having an end sealing collar at least partially sealing the eccentric wheel in relation to a housing wall and has a static sealing ring.

* * * * *